United States Patent [19]
Hazenbroek

[11] Patent Number: 5,976,004
[45] Date of Patent: Nov. 2, 1999

[54] PARTIALLY DEBONED POULTRY PRODUCT AND PROCESS

[75] Inventor: Jacobus E. Hazenbroek, Klaaswaal, Netherlands

[73] Assignee: Systemate Holland, B.V., Numansdorp, Netherlands

[21] Appl. No.: 09/136,387

[22] Filed: Aug. 18, 1998

Related U.S. Application Data

[63] Continuation-in-part of application No. 08/988,752, Dec. 11, 1997, and a continuation-in-part of application No. 08/782,876, Jan. 14, 1997
[60] Provisional application No. 60/010,450, Jan. 23, 1996, and provisional application No. 60/071,945, Jan. 20, 1998.
[51] Int. Cl.[6] ................................................. A22C 25/16
[52] U.S. Cl. .............................................. 452/136; 452/138
[58] Field of Search ............................... 452/136, 125, 452/127, 135

[56] References Cited

U.S. PATENT DOCUMENTS

| | | |
|---|---|---|
| 3,456,284 | 7/1969 | Werner et al. . |
| 3,629,903 | 12/1971 | Turner . |
| 3,672,000 | 6/1972 | Martin et al. . |
| 4,327,463 | 5/1982 | Martin . |
| 4,377,884 | 3/1983 | Viscolosi . |
| 4,380,849 | 4/1983 | Adkinson et al. . |
| 4,446,600 | 5/1984 | Hooley et al. . |
| 4,488,332 | 12/1984 | Atteck et al. . |
| 4,495,675 | 1/1985 | Hill et al. . |
| 4,736,492 | 4/1988 | Hazenbroek et al. . |
| 4,811,456 | 3/1989 | Heuvel . |
| 4,843,682 | 7/1989 | Bowen . |
| 5,064,403 | 11/1991 | Elsten ...................................... 452/135 |
| 5,090,940 | 2/1992 | Adkinson ................................ 452/136 |
| 5,173,076 | 12/1992 | Hazenbroek ........................... 452/135 |
| 5,277,649 | 1/1994 | Adkinson ................................ 452/138 |
| 5,297,984 | 3/1994 | Gagliardi, Jr. .......................... 452/138 |

*Primary Examiner*—Willis Little
*Attorney, Agent, or Firm*—Thomas, Kayden, Horstemeyer & Risley

[57] ABSTRACT

Poultry parts which have elongated bones, such as poultry thighs (10), legs (40), or segments of wings (not shown) are moved with respect to a stripper element, such as an apertured disk (24 or 54) or stripper blades (79 and 80), so as to partially strip the meat (12, 42) from the bone (11, 41). The partially deboned product is formed with the meat accumulated at one end of the bone, with the stripped portion of the bone being substantially free of meat. The product is cooked and the cooked meat remains at one end of the product, leaving the substantially bare bone available for grasping by the fingers of the human hand, so that the product becomes finger food that is substantially free of grease, etc.

18 Claims, 8 Drawing Sheets

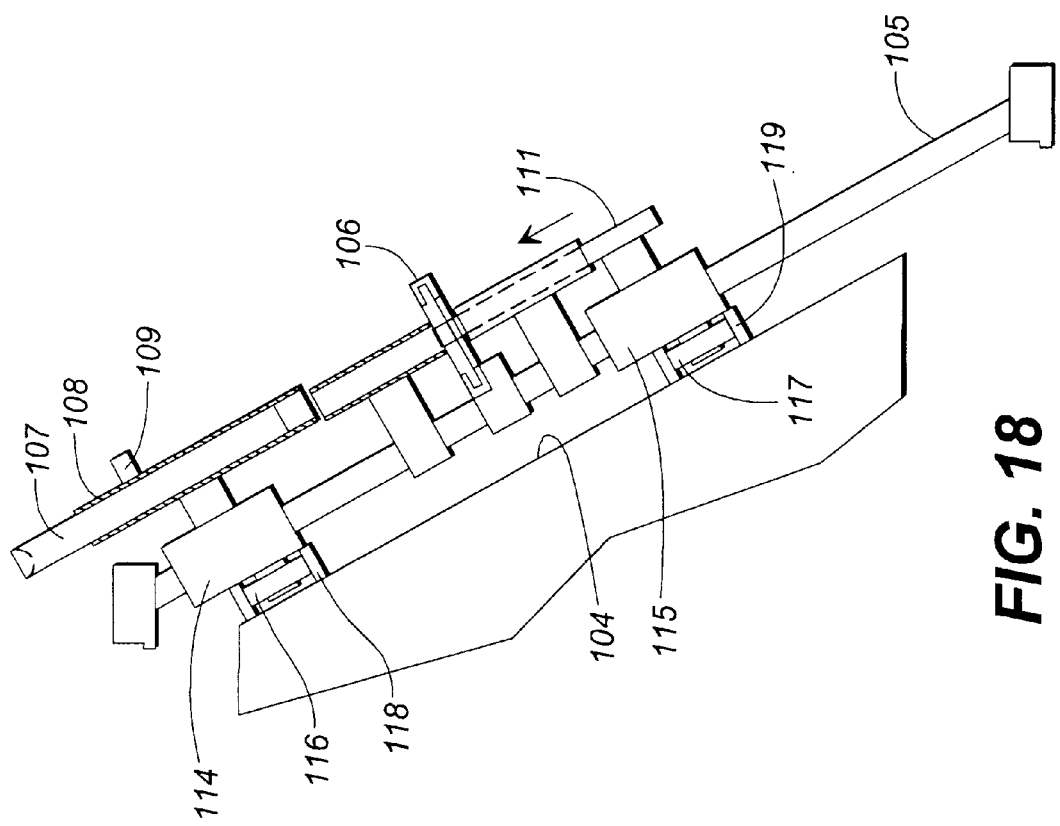
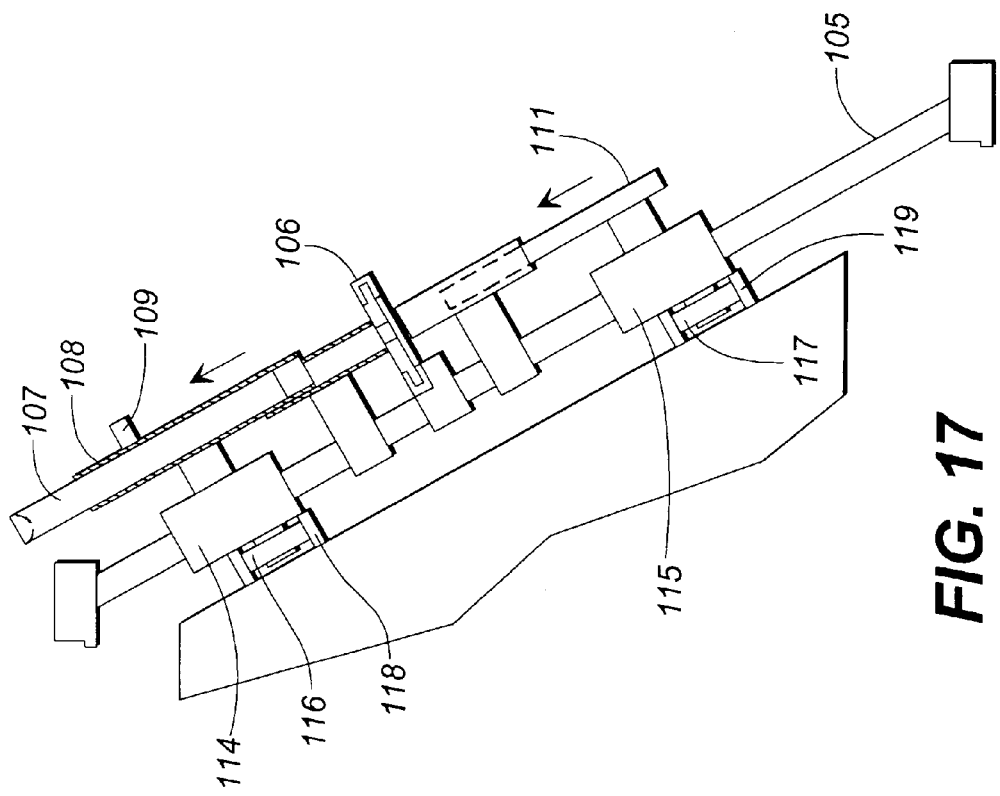

PARTIALLY DEBONED POULTRY PRODUCT AND PROCESS

CROSS REFERENCE TO RELATED APPLICATION

This is a continuation-in-part of U.S. patent application Ser. No. 08/988,752, filed Dec. 11, 1997, and is a continuation-in-part of U.S. patent application Ser. No. 08/782,876 filed Jan. 14, 1997, which claims the benefit of U.S. Provisional Application 60/010,450 filed Jan. 23, 1996, and applicant claims priority with respect to U.S. Provisional Application 60/071,945 filed Jan. 20, 1998.

FIELD OF THE INVENTION

This invention relates to a partially deboned poultry product, such as the leg, thigh, or wing of a chicken, which has the meat partially stripped away from the bone, with the product being cooked so that the bone remains exposed and functions as a handle for eating the product. Further, the invention relates to the method and apparatus for producing the product.

BACKGROUND OF THE INVENTION

Small poultry parts have become popular as "finger foods" in that the parts such as wing segments are separated from the adjacent wing segments and the body of the bird and are prepared as small food items that are held by the hand while eating. The products have been successful in casual restaurants and in fast food restaurants and other places as hors d'ouerves and snack foods.

One of the problems with the poultry finger foods is that when the products are cooked, the person eating the cooked product as a finger food is likely to accumulate grease on his or her fingers. This requires additional attention by the person eating the product, such as requiring a napkin, handkerchief or towel for removing the grease from the fingers. This can be inconvenient when the person eating the snack food is able to use only one hand during the eating process, as when holding a glass, cup, or other object in the other hand.

It would be desirable to provide a cooked finger food formed of poultry parts which can be handled by the hand substantially without leaving a residue of grease on the fingers of the hand.

SUMMARY OF THE INVENTION

Briefly described, the present invention comprises a partially deboned poultry product which, in its final form, comprises a cooked poultry product having an elongated bone with the meat partially stripped away from the bone so that a portion of the bone is left exposed with the meat clinging to the unexposed portion of the bone. The exposed bone becomes a handle for the person eating the product, so that the fingers of the person eating the product do not directly contact the meat of the product. Since the meat of the product is more likely to carry grease than the bone, the bone becomes a substantially grease-free handle.

Preferably, the poultry parts to be prepared in this manner comprise thighs, legs and wing segments of a chicken or similarly sized fowl.

In those instances where the poultry parts bear excessive meat, such as the thigh of an average sized chicken, some of the meat can be removed from the poultry part before the poultry part is prepared as an edible product. For example, the sides of a thigh on one or both sides of the thigh bone can be cut away before the product is cooked so that the product has a smaller amount of meat and is not too large to handle when it is being held by hand and is not too large to eat with two or three bites.

The invention includes the process of producing the partially deboned poultry product. The process is performed by urging the bone of the poultry part through a constricted space of a stripper tool, such as through the opening of a stripper disk or diaphragm, or between a pair of stripper blades, so that the meat clinging to the bone is stripped away from the bone as the bone passes through the opening of the tool. This progressively strips the meat from the first end of the bone. Before the stripper tool reaches the second end of the bone, the stripping process is terminated, leaving the meat clinging to the second end of the bone, usually everted or at least gathered about the second end of the bone and leaving the first end of the bone exposed. The partially stripped poultry part is then further processed, including cooking the product. During the cooking procedure, the exposed portion of the bone is likely to be exposed to grease and other items exuded from the meat, as well as any additives used in the cooking process. However, since the bone typically does not absorb much liquid, the bone usually will be substantially free of grease, etc. after the cooking process. Further, during and after the cooking process, the meat continues to be attached to the second end of the bone, with the meat being accumulated at the second end of the bone and with a substantial amount of the meat having been detached from the first end of the bone. This makes the product convenient to handle, by grasping one end of the bone with the fingers and by eating the meat directly from the other end of the bone. The cooked meat offers little resistance to being bitten away or torn away from the bone, thereby forming a desirable edible finger food product.

In the course of producing the finger food product, there is substantially no waste created of the meat. All of the meat can remain attached to the bone, even though a substantial portion of the meat is stripped from along the length of the bone. With this arrangement, the yield of the meat of the finger food product is substantially 100%. For example, when meat is stripped from bone in a conventional deboning process, typically some meat remains clinging to the bone and there is a loss of yield of the meat which remains on the bone. In the process of producing the finger food product of this invention, since both the meat and the bone form the end product, there is virtually no loss of yield of meat in the end product.

Thus, it is an object of the present invention to provide an improved process for forming a finger food poultry product and an improved finger food poultry product.

Another object of this invention is to provide a process of forming an edible poultry product from a poultry part having an elongated bone and meat surrounding and attached to the bone, by stripping the meat from the elongated bone from one end partially along the length of the bone so as to accumulate meat along the second end of the bone and to form a product having a portion of the bone substantially free of meat where the meat has been stripped away from the bone and having the meat supported by the other end of the bone.

Another object of this invention is to provide an automated process of forming an improved finger food poultry product which includes a partially exposed bone that forms a convenient, substantially grease-free handle for holding the product.

Another object of the invention is to provide an improved oven ready poultry product, and a cooked poultry product that has an elongated bone with meat stripped from one end toward the other end of the bone and gathered at and usually everted about the other end of the bone.

Other objects, features and advantages of the present invention will become apparent upon reading the following specifications, when taken in conjunction with the accompanying drawings.

BRIEF DESCRIPTION OF THE DRAWINGS

FIG. 2 disclosing the separation of excess meat from the poultry thigh; and FIGS. 3–5 showing the progressive stripping steps.

FIGS. 15–18 are progressive elevational views of one of the stripper stations of the deboner shown in FIG. 14.

DETAILED DESCRIPTION

Figure 1:
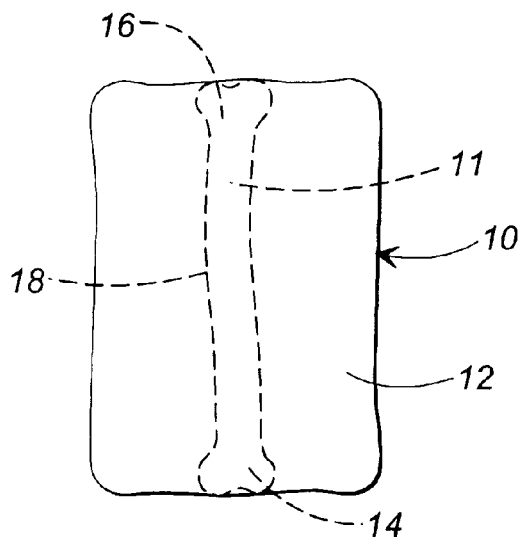
FIGS. 1–5 are progressive schematic illustrations of the process of forming an uncooked poultry thigh into an edible finger food product, with FIG. 1 representing a poultry thigh including the bone and the meat attached to the bone.

Referring now in more detail to the drawings, in which like numerals indicate like parts throughout the several views, FIG. 1 illustrates a poultry thigh 10 which includes a bone 11 and meat 12 surrounding the bone. The bone has a first or distal end 14, a second or proximal end 16, and an intermediate portion 18.

In those instances where it is desirable to produce an end product having less meat than is originally formed on the poultry thigh 10, the product will be cut, by hand or by automated cutter disks (not shown), to remove the sides 20 and 22, leaving a smaller product 10A.

Figure 3:
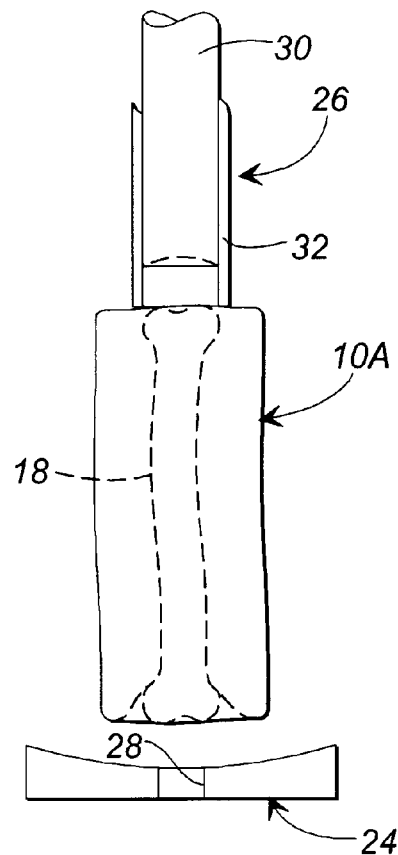
Figure 2:
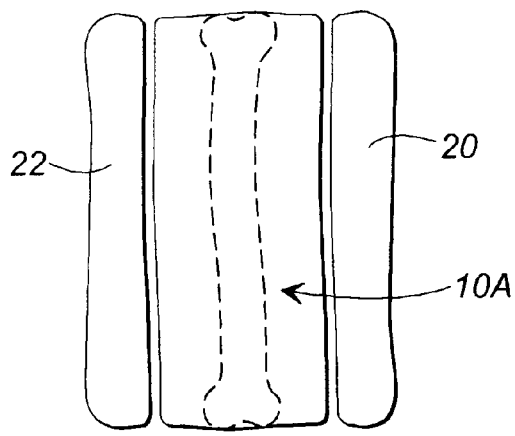
Figure 13:
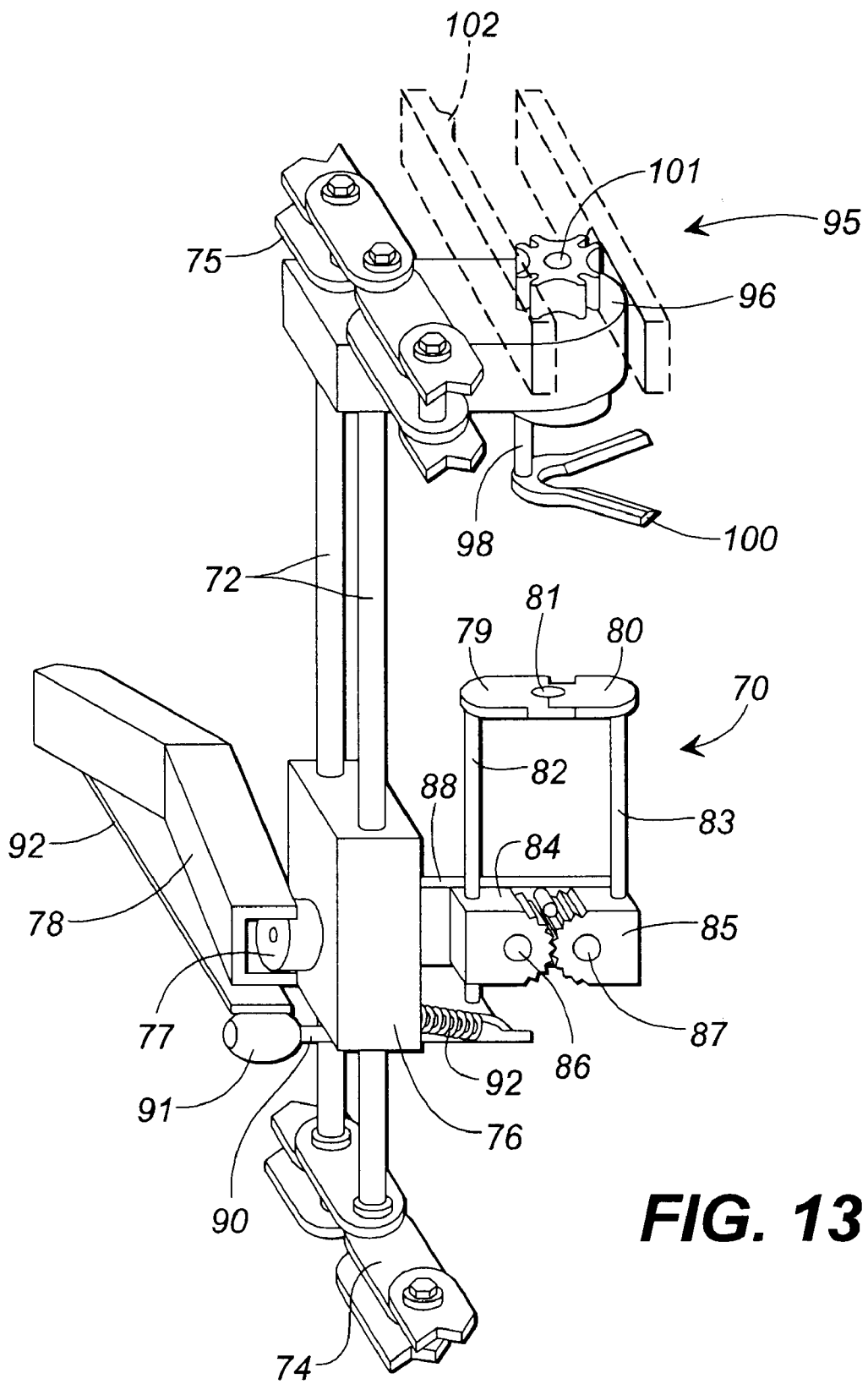
FIG. 13 is a perspective illustration of a deboner which can be used to form the products of FIGS. 1–12, using a pair of stripper blades that move together and strip the meat from the bone of the poultry part.
Figure 14:
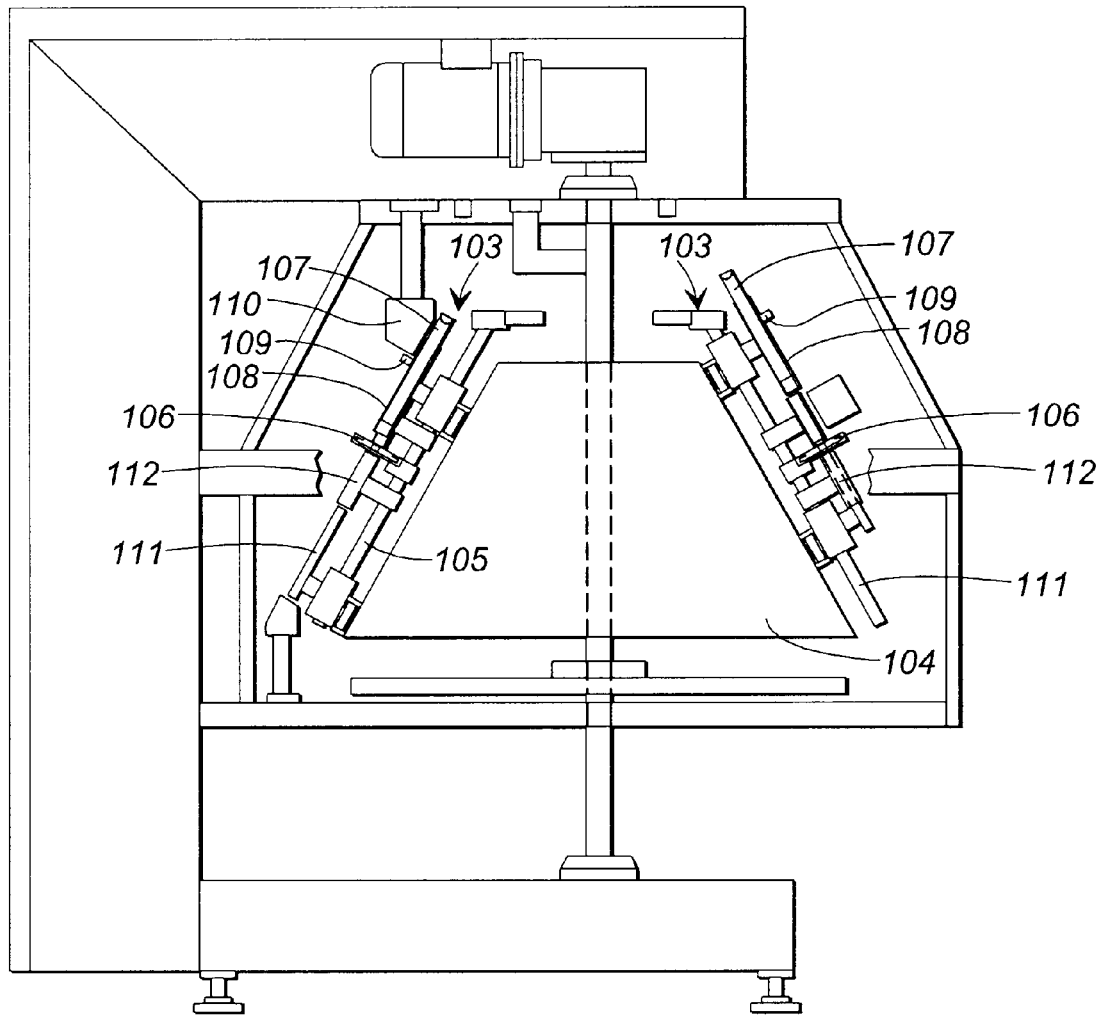
FIG. 14 is a schematic elevational view of another type of deboner that can be used to strip the meat from the bone of the poultry part, with the bone being thrust through a small opening of a flexible disk, with the disk scraping the meat from the bone.
Figure 16:
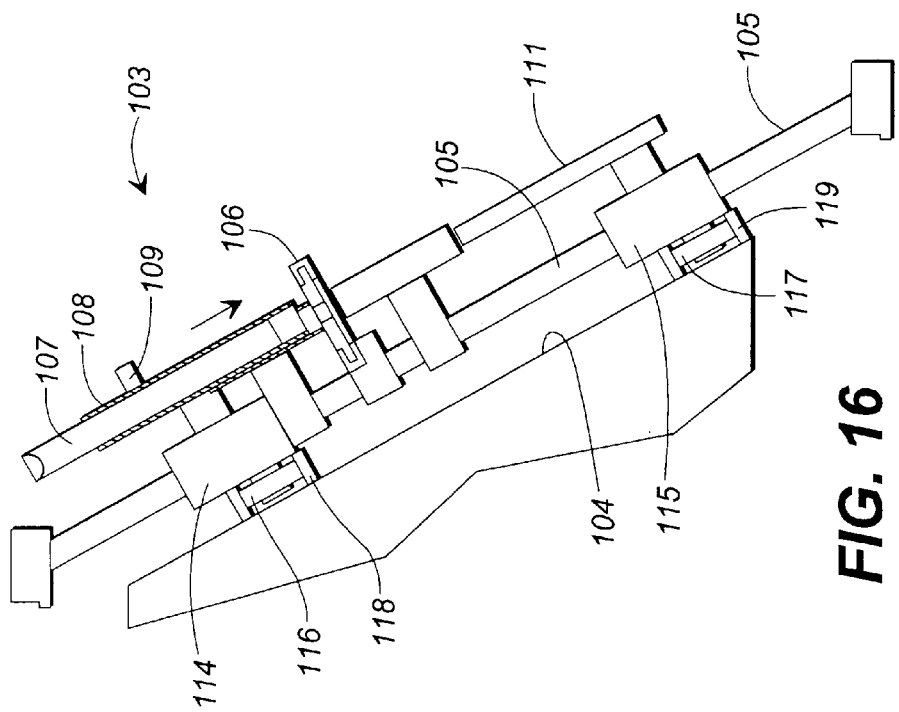
Figure 15:
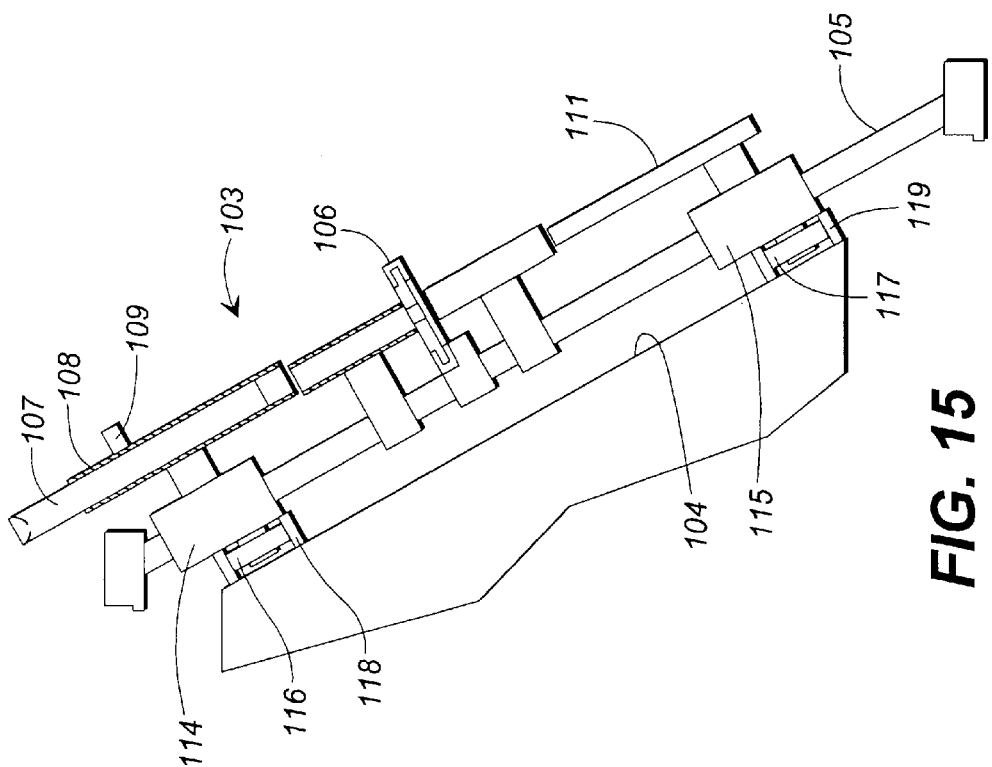

The product 10A is moved to a processing machine such as that shown in FIG. 13 or that shown in FIGS. 14–18. If used with a stripper disk machine (FIGS. 14–18), the thigh 10A (FIG. 3) is aligned with a stripper disk 24 and a pusher 26. The stripper disk is made of a resilient material, such as hard rubber, of the type disclosed in U.S. Pat. Nos. 4,811,456 and 5,173,076, which disclose a disk having an opening 28 formed therein. The pusher 26 includes a push rod 30 which reciprocates in tube 32. The bone 18 of the thigh is aligned between the pusher 26 and the opening 28 of the scraper disk 24.

Figure 4:
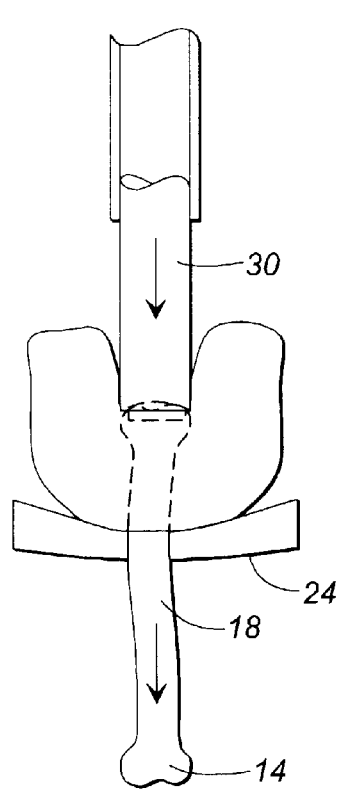
Figure 5:
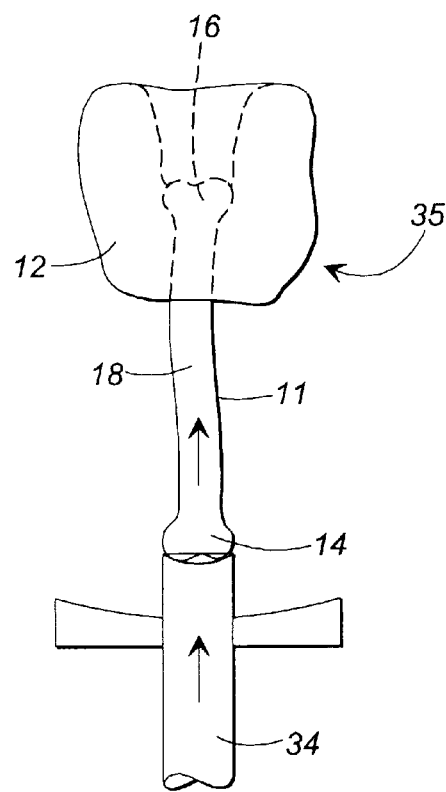

As illustrated in FIG. 4, the push rod 30 pushes the bone 18 partially through the opening of the disk 24. The edges of the opening resist the movement of the meat through the opening since the bone itself tends to fill the opening, so that the mass of the meat is stripped from the portion of the bone that is pushed through the opening. As the mass of the meat reaches the second end of the bone as shown in FIGS. 4 and 5, the meat usually becomes everted about the second end of the bone.

Since it is desirable to leave the meat clinging to the second end of the bone that has not yet been pushed through the opening of the disk, the bone will be pushed back through the opening of the disk. This is illustrated in FIG. 5, where a second pusher 34 engages the protruding first end of the bone 14 and pushes the bone back through the opening of the disk.

This forms the partially deboned poultry product 35, which includes the bone 11 that is substantially free of meat at its first end 14 and along its intermediate portion 18. The meat 12 of the product is gathered in a mass at the second or proximal end 16 of the bone and usually is substantially everted about the end 16 of the bone. Since the portion of the mass of the meat at the second end of the bone has not been stripped from the bone, all of the meat tends to cling to the second end of the bone.

Figure 6:
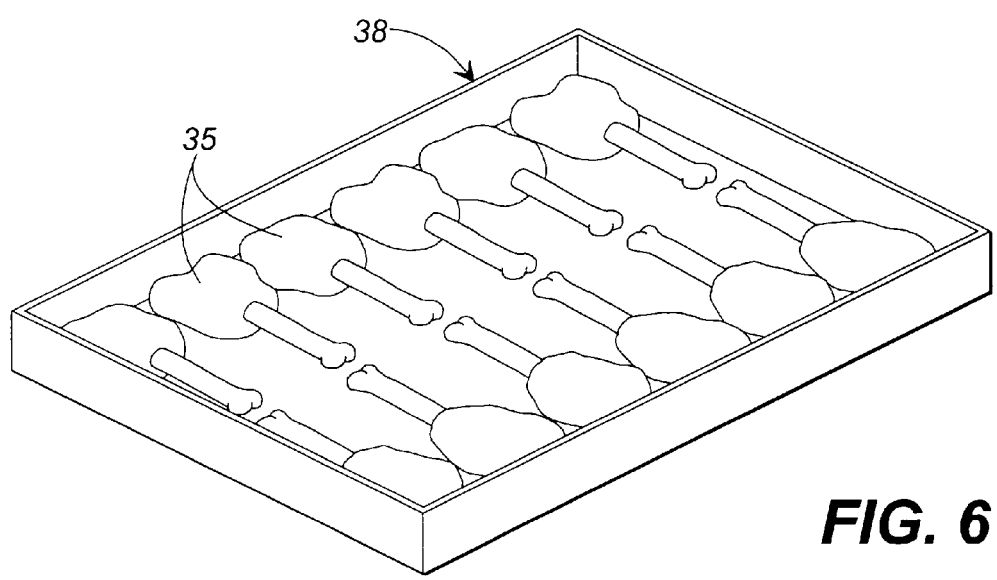
FIG. 6 illustrates the uncooked poultry thighs of FIGS. 1–5 in a pan and ready to enter an oven.

As illustrated in FIG. 6, a plurality of the partially deboned poultry products 35 are oven ready and are placed in a cooking pan 38 or other type cooking container, and the product is then passed through an oven, deep fat fryer, etc., to cook the products. When the product has been cooked, it tends to retain its shape as shown in FIGS. 5 and 6, so that the intermediate portion 18 and first end portion 14 of the bone 11 remain free of meat and the meat is gathered at the second end 16, usually everted about the second end.

Figure 7:
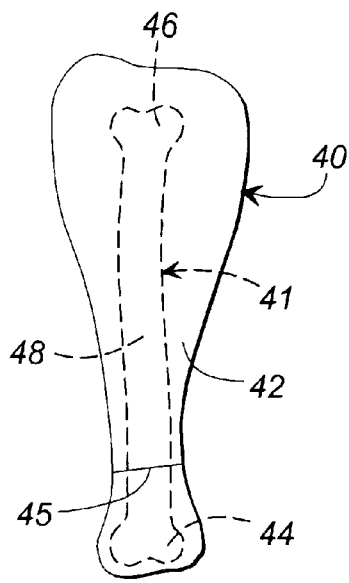
FIGS. 7–11 are similar to FIGS. 1–5, but showing as the poultry part a leg of a bird.

FIGS. 7–12 show a similar product and similar process for forming the product. FIG. 7 illustrates a conventional chicken leg 40 having a bone 41 and meat 42 surrounding the bone. The bone has a first distal end 44, a second proximal end 46, and an intermediate portion 48. In some instances the meat will be cut at 45 adjacent the distal end 44 of the bone 41, to enable the stripping of the meat to be performed without leaving significant amounts of meat clinging to the intermediate portion 48 of the bone.

Figure 8:
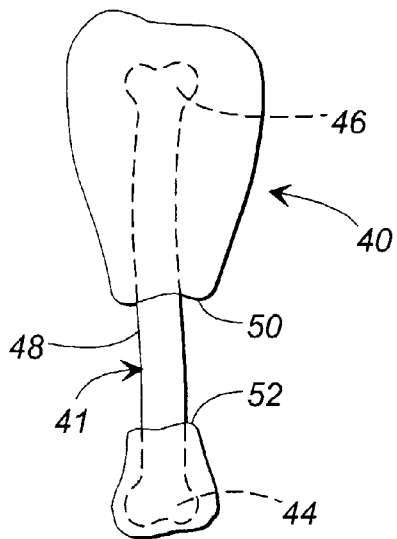

As illustrated in FIG. 8, when the chicken leg 40 has more meat than desired for the end product, the product can be cut at 50 and 52 to remove the span of meat extending along the intermediate portion 48 of the bone 41.

Figure 9:
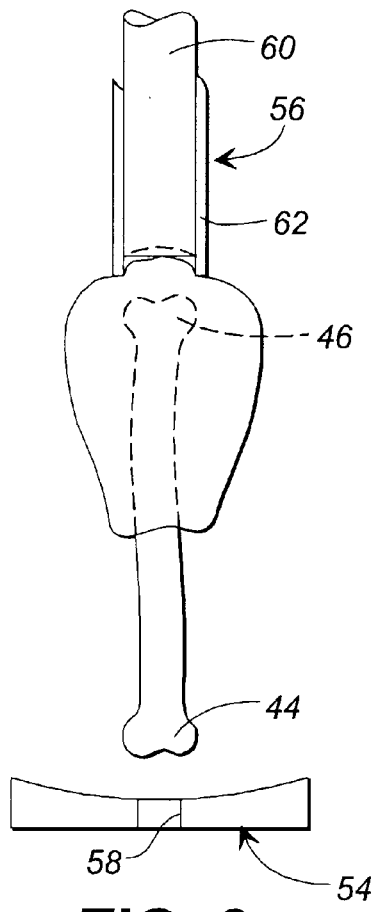

The poultry part is then moved to the stripping apparatus which includes the stripper disk 54 and pusher 56. The distal or first end of the bone 44 is aligned with the opening 58 of the stripper disk 54, and the second or proximal end 46 of the bone is aligned with the pusher 56. The push rod 60 moves through the tube 62 of the pusher 56 and engages the second end of the bone, forcing the first or distal end 44 through the opening 58, as illustrated in FIGS. 9 and 10.

Figure 10:
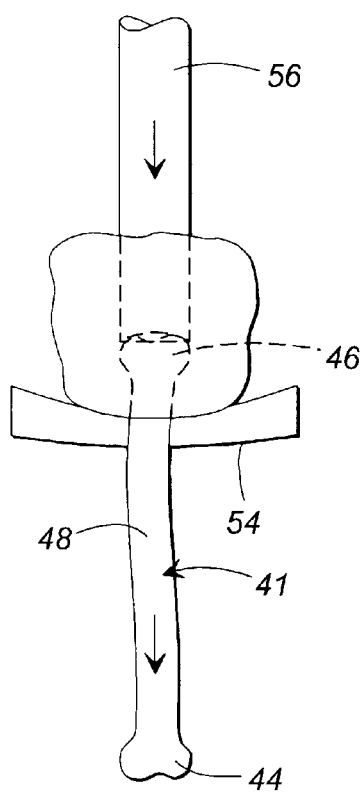
Figure 11:
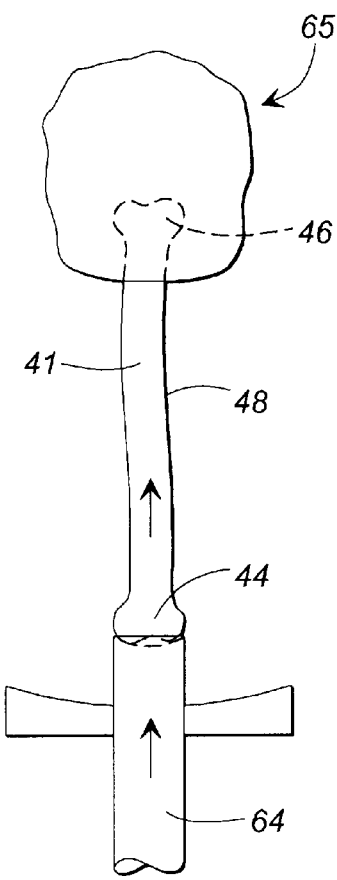

As illustrated in FIG. 10, the pusher 56 moves the distal end 44 and intermediate portion 48 of the bone 41 a predetermined distance through the disk 54 to partially strip the mass of the meat from the bone and to gather the meat at one end of the bone, with the meat usually everted about the end 46 of the bone. As shown in FIG. 11, a second pusher 64 engages the first end 44 of the bone, pushing the previously stripped intermediate portion 48 of the bone and the first end 44 of the bone back through the disk. This leaves the stripped meat as well as the meat not yet stripped from the bone in an accumulation about the second end 46 of the bone 41, forming the uncooked, partially deboned oven ready poultry product 65.

Figure 12:
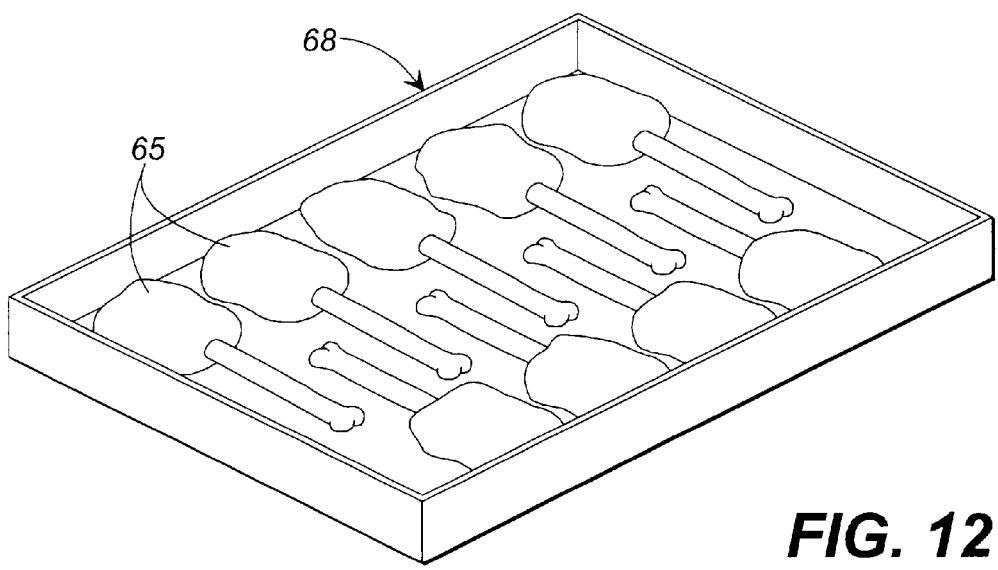
FIG. 12 illustrates the uncooked poultry legs of FIGS. 7–11 in a pan and ready to enter an oven.

After several of the poultry products 65 have been formed as illustrated in FIGS. 7–11, they are accumulated in a cooking pan or other cooking vessel 68 and cooked, as by passing through an oven or into a deep fat fryer, etc. (not shown). The resulting cooked product has its bone exposed at one end and the meat everted about the other end of the bone, generally as shown in FIG. 12.

While poultry thighs and poultry legs have been illustrated in FIGS. 1–12, wing portions can be formed in the same way, by stripping meat away from the bone, partially along the length of the bone, so that the meat is accumulated about the second end of the bone.

As illustrated in FIG. 13, a minor modification to prior art stripping equipment can be made to produce the product of FIGS. 1–12. A prior art stripper is disclosed in U.S. Pat. No. 5,067,927. Meat stripper modules 70 are arranged in series on a continuous conveyor system, with each module including a pair of upright parallel guide bars 72, with the bars being mounted at their ends to upper and lower conveyor chains 74 and 75. Slide block 76 is slidably mounted to guide bar 72, and cam wheel 77 is rotatably mounted to the slide block 76 and follows a cam track 78.

The facing edges of stripper blades 79 and 80 are complementary in shape and when mated together as shown in FIG. 13, form a stripper opening 81. The stripper blades 79 and 80 are mounted to support rods 82 and 83, and the support rods are mounted at their lower ends to a pair of gear blocks 84 and 85. The gear blocks are mounted on pivots 86 and 87, with the pivots being mounted to support plate 88. The support plate is carried by the slide block 76. Cam lever 90 is mounted at one end to gear block 84, and follower roller 91 is rotatably mounted on its distal end. Roller 91 engages a cam surface 92 which tilts gear blocks 84 and 85, causing the stripper blades 79 and 80 to move toward and away from each other. Coil tension spring 92 urges the stripper blades 79 and 80 to the closed position as shown in FIG. 13.

A carrier 95 is mounted to the upper end of guide bar 72. The carrier 95 includes carrier block 96 that is mounted to upper conveyor chain 75, stem 98 that extends down through an opening in the carrier block 96, horizontally extending carrier fork 100 that is mounted to the lower end of stem 98, and turning gear 101 that is mounted to the stem 98 above the carrier block 96. The turning gear is shaped so that when it engages a protrusion, such as protrusion 102 along the path of the upper conveyor chain, the turning gear rotates 90°, causing the carrier fork 100 to turn through an equal arc.

When in operation, a poultry part, such as a poultry thigh is wedged into the crotch of the carrier fork 100, by placing a knuckle at the distal end of the thigh bone just above the carrier fork and with the remaining portion of the thigh extending below the carrier fork, so as to present the meat and major portion of the bone of the thigh to the stripper blades 79 and 80. As the conveyor chains 74 and 75 move along the conveyor system, the meat stripper 70 follows the cam track 78, so as to move up and down the guide bar 72. When the meat stripper moves upwardly, the cams 78 and 92 are shaped so as to open the stripper blades 79 and 80 from each other, so that the stripper blades will pass on opposite sides about the poultry thigh until the stripper blades are positioned immediately beneath the carrier fork 100, whereupon the cams 92 and 78 are shaped so as to cause the stripper blades to close together and form the stripper opening 81, which will be placed about the bone at the top of the thigh, just beneath the carrier fork 100. Once in place, the stripper blades will be urged downwardly by the cam 78, so as to strip the meat from the bone of the poultry thigh. In the meantime, the carrier fork 100 will be rotated by turning gear 101, thereby turning the meat and bone of the poultry thigh with respect to the stripper blades 79 and 80, thereby assisting in the stripping function.

As the stripper blades 79 and 80 approach the lower, first proximal end of the bone of the poultry thigh, the blades will be urged slightly apart by the shape of the cam 92, so that the stripping of the meat terminates. As the blades continue to move downwardly, the loose meat of the product will be urged about the lower end of the bone, so as to assure that the meat extends about the lower end of the bone.

As illustrated in FIGS. 14–18, the disk type stripper can be used to partially debone the products of FIGS. 1–12. A plurality of deboning devices 103 are mounted about a stationary conical cam drum 104. The deboning devices 103 are mounted to pairs of guide bars 105. A stripper disk or diaphragm 106, of the type illustrated in FIGS. 3, 4, 5, 9, 10 and 11, are mounted to the guide bars 105, intermediate the lengths of the guide bars. As before, these stripper disks each have an opening therethrough for stripping the meat from the bones of the poultry parts.

Upper pusher rod 107, similar to pusher rods 30 and 60 of FIGS. 3, 4, 9 and 10, extends through open ended tube 108, and cam follower 109 is connected to the upper pusher rod 107 Cam follower 109 is controlled by cam surface 110, so as to reciprocate through the open ended tube 108, so that the lower end of the guide bar 105 will reciprocate toward and through the opening of the stripper disk, as described before.

A lower pusher rod 111 slides through its open ended tube 112, and its upper end also is aligned with the opening of the stripper disk, for pushing the bone of the poultry part back through the stripper disk.

The upper pusher rod and lower pusher rod are each mounted to a slide block 114 and 115, respectively, with the slide blocks 114 and 115 being slidable along the pairs of guide bars 105. Cam wheels 116 and 117 are rotatably mounted to the upper and lower slide blocks 114 and 115, respectively, and cam wheels 116 and 117 follow the cam tracks 118 and 119 which are rigidly mounted to the stationary cam drum 104. This causes the upper and lower pusher rods 107 and 111 to reciprocate through the opening of the stripper disk 106, thereby causing the bone of the poultry to be thrust through the opening so as to strip the meat from the bone, and to be thrust back through the opening, as described in connection with FIGS. 4, 5, 10 and Although preferred embodiments of the invention have been disclosed in detail herein, it will be obvious to those skilled in the art that variations and modifications of the disclosed embodiments can be made without departing from the spirit and scope of the invention as set forth in the following claims.

What is claimed is:

1. A process of forming an edible poultry product from a poultry part having an elongated bone and a mass of meat in its natural configuration surrounding and attached to the bone along the length of the bone, comprising:

aligning a first end of the bone of the poultry part with an opening of a flexible disk:

pushing against the second end of the bone to urge the first end of the bone and an intermediate portion of the bone through the opening of the flexible disk;

as the first end and intermediate portion of the bone are pushed through the opening of the flexible disk, progressively stripping the mass of the meat from the bone of the poultry part along the length of the bone from a position adjacent a first end of the bone toward a second end of the bone; accumulating at least a portion of the stripped meat about the second end of the bone and leaving at least some of the meat originally attached to the second end of the bone;

terminating the stripping the mass of the meat from the bone before all of the mass of the meat has been separated from the bone to form a product having a portion of the bone substantially free of meat where the mass of the meat has been stripped from the first end of the bone and having the mass of the meat of the poultry part supported by the second end of the bone of the poultry part;

after the meat has been accumulated about the second end of the bone, pushing the first end of the bone back through the opening of the flexible disk; and cooking the product without permitting the meat to resume its natural configuration about the bone.

2. The process of claim 1 and further including the step of everting the meat about the second end of the bone.

3. A product formed by the process of claim 1.

4. The process of claim 1, wherein the poultry part is a leg.

5. The process of claim 1, wherein the poultry part is a thigh.

6. The process of claim 1, wherein the poultry part is a wing segment.

7. The process of claim 1, wherein the bone has knuckles on said first and second ends, and further including the step of cutting the meat from the knuckle of the bone at the first end of the bone.

8. The process of claim 1, wherein the bone has an intermediate portion between said first and second ends, and further including the step of removing the meat from the intermediate portion of the bone prior to stripping the meat toward said second end.

9. A process of forming an edible food product from poultry parts of birds, the poultry parts each having at least one elongated bone with a proximal end, a distal end and an intermediate portion between the proximal and distal ends, and meat surrounding and attached to the bone, comprising the steps of:

placing the poultry parts in a spaced series of modules of a rotary processing machine with each poultry part having its bone aligned between a bone mover and a stripper of the processing machine;

revolving the modules about a central axis;

in response to the revolving of the modules:
moving with the bone mover of each module the intermediate portion of each bone beginning at the distal end of each bone partially through the stripper,
as the bone is moved through the stripper, stripping the meat from along the intermediate portion of the bone and forming the intermediate portion of the bone with substantially no meat clinging to the bone,
as the proximal end of the bone approaches the stripper everting some of the meat stripped from the bone about the proximal end of the bone,
terminating the stripping of the meat from the bone before all the meat has been stripped from the bone and leaving some of the meat clinging to the bone at the proximal end of the bone,
after the meat has been everted about the proximal end of the bone, removing the bone from the stripper with the meat remaining everted about the proximal end of the bone, and
cooking the poultry parts with the meat still everted about the proximal end of the bones so that the bones protrude from the meat and form handles for eating the meat.

10. The process of claim 9, and before stripping the meat from the bone cutting a span of the meat extending along the bone between the proximal and distal ends of the bone and removing the span of cut meat from the bone.

11. The process of claim 9, wherein the step of moving the bone with the bone mover comprises pulling the distal end of the bone.

12. The process of claim 9, wherein the step of moving the bone with the bone mover comprises pushing the proximal end of the bone.

13. The process of claim 9, wherein the step of removing the bone from the stripper comprises opening the stripper and passing the meat and bone through the stripper.

14. The process of claim 9, wherein the step of removing the bone from the stripper comprises pushing the bone back through the stripper without passing the stripped meat through the stripper.

15. A product formed by the process of claim 9.

16. Apparatus for forming edible food products from poultry parts, the poultry parts each having at least one elongated bone with a proximal end, a distal end, and an intermediate portion, and meat surrounding and attached to the bone, comprising:

a stationary cam drum, a rotary support rotatable about said cam drum, a plurality of stripper modules positioned about said rotary support, each stripper module including a meat stripper and upper and lower bone movers positioned above and below said meat stripper respectively, said bone movers being movable toward and away from said meat stripper, said cam drum including a cam track for moving said bone movers toward and away from said meat strippers in response to the rotary movement of said rotary support about said cam drum, said cam track configured to move said upper bone mover from a position that accommodates a poultry part between said upper bone mover and said meat stripper with the bone aligned between said upper bone mover and said meat stripper to a position in which the distal end of a bone of a poultry part has moved by said upper bone mover through said meat stripper and said proximal end has moved adjacent said meat stripper, said cam track configured to move said lower bone mover from a position that accommodates the distal end of a bone of a poultry part protruding through said meat stripper to a position in which the distal end of the bone of the poultry part has been moved back through said meat stripper.

17. The apparatus for forming edible food products from poultry parts of claim 16, wherein said cam track is configured to move said lower bone mover partially through said meat stripper to completely expel the bone from said meat stripper.

18. Apparatus for forming edible food products from poultry parts, the poultry parts having at least one elongated bone with a proximal end, a distal end, and an intermediate portion, and meat surrounding the bone, comprising:

a stationary cam drum, a rotary support rotatable about said cam drum, a plurality of stripper modules positioned about said rotary support and engaging said cam drum, each stripper module including a meat stripper and a bone mover movable toward and away from each other in response to the rotation of said rotary support moving about said cam drum, said bone mover configured to engage and move the distal end of the bone, said meat stripper including stripper blades moveable toward and away from each other to grasp, strip meat from and release the bone of a poultry part in response to the rotation of said rotary support moving about said cam drum, said cam drum configured to move said stripper blades into engagement with the bone of a poultry part at a position adjacent the distal end of the bone and to move said bone mover with respect to said stripper to move the bone through the stripper a distance for the stripper to strip the meat from adjacent the distal end and along the intermediate portion of the bone toward the proximal end of the bone and then to open the stripper blades as the stripper approaches the proximal end of the bone to leave meat clinging to the bone at the proximal end of the bone and to pass about the proximal end of the bone, to first strip the meat from the intermediate portion of the bone and then to collect and to evert some of the stripped meat about the proximal end of the bone.

\* \* \* \* \*